United States Patent
Du et al.

(10) Patent No.: US 9,325,694 B2
(45) Date of Patent: *Apr. 26, 2016

(54) ANONYMOUS ENTITY AUTHENTICATION METHOD AND SYSTEM

(75) Inventors: Zhiqiang Du, Shaanxi (CN); Manxia Tie, Shaanxi (CN); Xiaolong Lai, Shaanxi (CN); Qiongwen Liang, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 47 days.

This patent is subject to a terminal disclaimer.

(21) Appl. No.: 13/884,712
(22) PCT Filed: Jul. 11, 2011
(86) PCT No.: PCT/CN2011/077024
§ 371 (c)(1), (2), (4) Date: May 10, 2013
(87) PCT Pub. No.: WO2012/062127
PCT Pub. Date: May 18, 2012

(65) Prior Publication Data
US 2013/0227289 A1    Aug. 29, 2013

(30) Foreign Application Priority Data
Nov. 12, 2010 (CN) .......................... 2010 1 0546320

(51) Int. Cl.
*H04L 9/32* (2006.01)
*H04L 29/06* (2006.01)
*H04M 3/42* (2006.01)

(52) U.S. Cl.
CPC .......... *H04L 63/0807* (2013.01); *H04L 9/3213* (2013.01); *H04L 9/3247* (2013.01);
(Continued)

(58) Field of Classification Search
CPC .......... H04L 9/32; H04L 9/3202; H04L 9/321; H04L 9/3213; H04L 9/3221; H04L 63/08; H04L 63/0807; H04L 63/0892; H04L 63/0421; H04L 2209/42
See application file for complete search history.

(56) References Cited

U.S. PATENT DOCUMENTS

| 5,491,750 A | 2/1996 | Bellare et al. |
| 7,181,614 B1 | 2/2007 | Gehrmann et al. |

(Continued)

FOREIGN PATENT DOCUMENTS

| CN | 1668005 A | 9/2005 |
| CN | 101141711 A | 3/2008 |

(Continued)

OTHER PUBLICATIONS

Bruce Schneier "Applied Cryptography $2^{nd}$ Edition : Protocols, algorithms, and source code in C" 1996 p. 59 and 60.*

(Continued)

*Primary Examiner* — Zachary A Davis
*Assistant Examiner* — Devin Almeida
(74) *Attorney, Agent, or Firm* — DLA Piper LLP (US)

(57) ABSTRACT

An anonymous entity authentication method includes the steps of: an entity B sending RB and IGB; an entity A sending RB, R'A, IGA and IGB to a trusted third party TP, the trusted third party TP checking a group GA and a group GB against IGA and IGB for legality; the trusted third party TP returning ResGA, ResGB and a token TokenTA or returning ResGA, ResGB, TokenTA1 and TokenTA2 to the entity A; the entity A sending TokenAB and IGA to the entity B for authentication by the entity B; and the entity B sending TokenBA to the entity A for authentication by the entity A. In this solution, anonymous entity authentication can be performed without passing identity information of the authenticated entity itself to the opposite entity. Furthermore this solution further relates to an anonymous entity authentication apparatus and a trusted third party.

16 Claims, 3 Drawing Sheets (52) U.S. Cl.
CPC ........ *H04L63/0421* (2013.01); *H04L 63/0823* (2013.01); *H04M 3/42008* (2013.01); *H04L 2209/42* (2013.01)

(56) References Cited

U.S. PATENT DOCUMENTS

| | | | |
|---|---|---|---|
| 8,356,179 | B2 | 1/2013 | Tie et al. |
| 2002/0076042 | A1* | 6/2002 | Sandhu et al. .......... 380/30 |
| 2003/0195857 | A1 | 10/2003 | Acquisti |
| 2004/0059685 | A1 | 3/2004 | Sakamura et al. |
| 2004/0260926 | A1 | 12/2004 | Arditti Modiano et al. |
| 2005/0097316 | A1 | 5/2005 | Kim |
| 2005/0257260 | A1 | 11/2005 | Lenoir et al. |
| 2006/0281442 | A1 | 12/2006 | Lee et al. |
| 2008/0091941 | A1 | 4/2008 | Yonezawa et al. |
| 2008/0178005 | A1 | 7/2008 | Gentry |
| 2008/0270798 | A1 | 10/2008 | Charles et al. |
| 2009/0089575 | A1 | 4/2009 | Yonezawa et al. |
| 2009/0254750 | A1 | 10/2009 | Bono et al. |
| 2009/0276630 | A1 | 11/2009 | Teranishi |
| 2010/0306839 | A1 | 12/2010 | Tie et al. |
| 2012/0072732 | A1 | 3/2012 | Canard et al. |
| 2012/0284518 | A1 | 11/2012 | Walker et al. |

FOREIGN PATENT DOCUMENTS

| | | |
|---|---|---|
| CN | 101247223 A | 8/2008 |
| CN | 101364876 A | 2/2009 |
| CN | 101599959 A | 12/2009 |
| CN | 101635624 A | 1/2010 |
| CN | 101640593 | 2/2010 |
| CN | 101645776 | 2/2010 |
| CN | 101674182 | 3/2010 |
| CN | 101984577 | 3/2011 |
| CN | 101997688 A | 3/2011 |
| EP | 2 214 429 | 8/2010 |
| JP | 2004-54905 | 2/2004 |
| JP | 2009-33740 | 2/2009 |
| JP | 2013-544052 | 12/2013 |

OTHER PUBLICATIONS

"Survey on 'Status of Identity Authentication Technologies,'" *Security Center of Information-Technology Promotion Agency*, Japan, Mar. 2003, pp. 13-19 and an English translation.

Kato, T. et al., "Development of Anonymous Authentication System for Personal Data Protection," pp. 569-574 (English Abstract).

"The Progress of Tri-Element Peer Authentication (TePA) and Access Control Method", *Tracks for Standard & Technology*, Jun. 2009, (http.//www.its.cesi.cn), p. 21-23.

A Study on Authentication Mechanism of WWW System Using IC Cards, Toshiaki Tanaka, Satoshi Hada and Mitsuru Yamada KDD R&D Labs, pp. 3-363-3-364 (English Summary).

A. Menezes, et al., "Handbook of Applied Cryptography," CRC Press, Inc., 1996, pp. 489-541.

Office Action dated Jun. 5, 2015 in corresponding U.S. Appl. No. 13/884,749.

* cited by examiner

ANONYMOUS ENTITY AUTHENTICATION METHOD AND SYSTEM

This application is a US National Stage of International Application No. PCT/CN2011/077024, filed on 11 Jul. 2011, designating the United States, and claiming the benefit of Chinese Patent Application No. 201010546320.9, filed with the Chinese Patent Office on Nov. 12, 2010 and entitled "Anonymous entity authentication method and system", which is hereby incorporated by reference in its entirety.

FIELD OF THE INVENTION

The present invention relates to the field of entity authentication and particularly to an anonymous entity authentication method and system.

BACKGROUND OF THE INVENTION

At present, an entity authentication method using an asymmetric cryptographic technique involves two scenarios in which there is an online trusted third party involving and in which there is no trusted third party involving, where the identity of an authenticated entity can be verified for legality through entity authentication, and also an authenticator can further obtain identity information of the authenticated entity, but such a scenario may arise in real life that the authenticated entity would not like to have its identity information disclosed. For example, when people vote on some sensitive event, e.g., voting on a personal appointment decision, electronic bidding, etc., anonymous voting is desirable, that is, their own voting opinions are signed without disclosing their identities. Thus there is a need of an anonymous entity authentication method capable of both authenticating the identity of an entity and protecting identity information of the authenticated entity from being exposed.

SUMMARY OF THE INVENTION

In order to address the foregoing technical problem in the prior art, the invention proposes an anonymous entity authentication method and system.

An anonymous entity authentication method includes the steps of:

an entity B sending a message 1 to an entity A to initiate an authentication process;

the entity A sending a message 2 to a trusted third party TP, wherein the message 2 includes an identity $I_{GA}$ of a group GA where the entity A resides;

the trusted third party TP verifying the group GA against $I_{GA}$ for legality upon reception of the message 2; and returning a message 3 to the entity A, wherein the message 3 includes a verification result $Res_{GA}$ of the group GA and a first token including a signature of the trusted third party TP;

the entity A sending a message 4 to the entity B upon reception of the message 3, wherein the message 4 includes $I_{GA}$ and a second token including $Res_{GA}$, the first token and a signature of the entity A; and the entity B verifying the message 4 upon reception of the message 4 and determining from a verification result the legality of the entity A.

An anonymous entity authentication apparatus includes:
a first message receiving unit configured to receive a message 1 sent by an entity B;
a first message sending unit configured to send a message 2 to a trusted third party TP, wherein the message 2 includes an identity $I_{GA}$ of a group GA where the anonymous entity authentication apparatus resides;
a second message receiving unit configured to receive a message 3 returned from the trusted third party TP, wherein the message 3 includes a verification result $Res_{GA}$ of the group GA and a first token including a signature of the trusted third party TP; and
a second message sending unit configured to send a message 4 to the entity B upon reception of the message 3, wherein the message 4 includes $I_{GA}$ and a second token including $Res_{GA}$, the first token and a signature of the entity A.

An anonymous entity authentication apparatus includes:
a first message sending unit configured to send a message 1 to an entity A to initiate an authentication process;
a first message receiving unit configured to receive a message 4 sent by the entity A, wherein the message 4 includes an identity $I_{GA}$ of a group GA and a second token including a verification result $Res_{GA}$ of a trusted third party TP on the group GA, a first token and a signature of the entity A, and the first token includes a signature of the trusted third party TP; and
an entity authenticating unit configured to verify the message 4 upon reception of the message 4 and to determine from a verification result the legality of the entity A.

A trusted third party apparatus includes:
a message receiving unit configured to receive a message 2 sent by an entity A, wherein the message 2 includes an identity $I_{GA}$ of a group GA where the entity A resides; and
a group verifying unit configured to verify the group GA against $I_{GA}$ for legality upon reception of the message 2 and to return a message 3 to the entity A, wherein the message 3 includes a verification result $Res_{GA}$ of the group GA and a first token comprising a signature of the trusted third party apparatus.

In the invention, an authenticated entity will not send its own identity information to an opposite entity or a trusted third party but will send only identity information of a group where it resides to the opposite entity or the trusted third party for verification, and a verification result will be passed to the requesting opposite entity. The opposite entity can verify a signature of the authenticated entity simply with a result of verification by the trusted third party on the group where the authenticated entity resides to thereby authenticate the identity of the authenticated entity. Throughout the authentication process, the identity information of the authenticated entity will be neither disclosed nor passed to the opposite entity to thereby avoid the identity information of the authenticated entity from being exposed. The invention defines an anonymous entity authentication mechanism capable of protecting identity information of an authenticated entity, as compared with the traditional entity authentication mechanism.

DETAILED DESCRIPTION OF THE EMBODIMENTS

A method according to the invention involves entities including authenticated entities A and B, groups GA and GB, and a Trusted third Party (TP). The entities A and B reside respectively in the groups GA and GB as members of the groups where they reside respectively. The Trusted third Party (TP) is a trusted third party of the entities A and B and the groups GA and GB to provide an authentication service for the entities. Before being authenticated, the entities A and B possess their own private keys respectively, the groups GA and GB possess their own group public keys respectively, and against signatures generated using their own private keys, the entities A and B can be verified using the pubic keys of the groups where they reside respectively.

The following notations are defined for the sake of convenience:

$Valid_{GX}$ indicates the validity of a certificate $Cert_{GX}$ (X represents A or B, where A refers to the entity A, and B refers to the entity B); $PublicKey_{GX}$ is a public key of a group GX; $I_{GX}$ is an identity of the group GX, which can be the certificate $Cert_{GX}$ or a distinguishing identifier GX of the group; $Res_{GX}$ indicates a verification result of the group GX consisted of the certificate $Cert_{GX}$ and the validity thereof $Valid_{GX}$ or of the group GX and the public key thereof $PublicKey_{GX}$; Token is a token field; sSY(M) is a signature of Y on a message M (Y represents A or B or T, where T refers to the trusted third party TP here and hereinafter); and Text is an optional text. "y∥z" indicates a result of concatenating sequentially a data item y and a data item z in that order.

Figure 1:
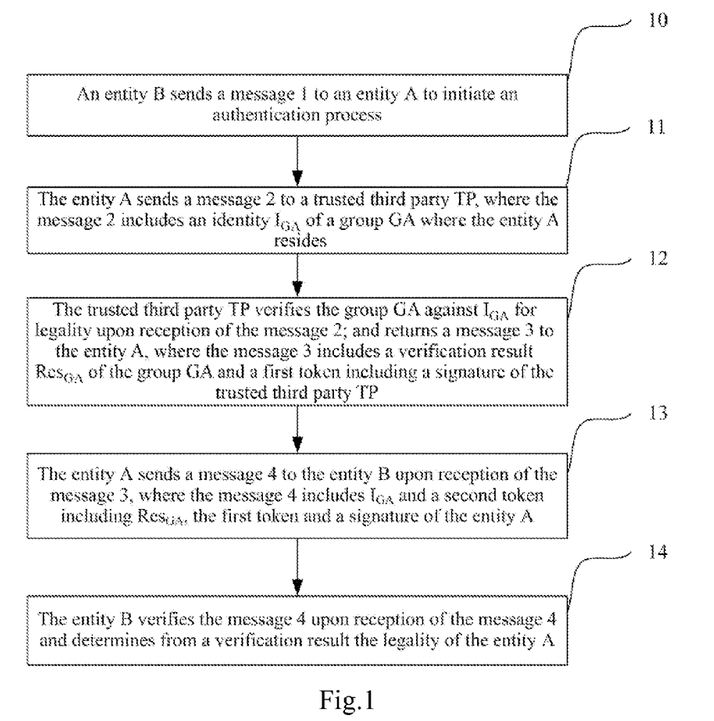
FIG. 1 is a schematic flow chart of a method according to an embodiment of the invention.

Referring to FIG. 1, an embodiment of the invention provides an anonymous entity authentication method, where the method includes the following steps:

Step 10: An entity B sends a message 1 to an entity A to initiate an authentication process;

Step 11: The entity A sends a message 2 to a trusted third party TP, where the message 2 includes an identity $I_{GA}$ of a group GA where the entity A resides;

Step 12: The trusted third party TP verifies the group GA against $I_{GA}$ for legality upon reception of the message 2; and returns a message 3 to the entity A, where the message 3 includes a verification result $Res_{GA}$ of the group GA and a first token including a signature of the trusted third party TP;

Step 13: The entity A sends a message 4 to the entity B upon reception of the message 3, where the message 4 includes $I_{GA}$ and a second token including $Res_{GA}$, the first token and a signature of the entity A; and Step 14: The entity B verifies the message 4 upon reception of the message 4 and determines from a verification result the legality of the entity A.

Preferably after the entity A receives the message 3 and before the entity A sends the message 4 to the entity B, the entity A can determine whether a random number $R'_A$ generated by the entity A in the message 2 is consistent with a random number $R'_A$ included in the signature of the trusted third party TP; and when the random number $R'_A$ generated by the entity A in the message 2 is determined as being consistent with the random number $R'_A$ included in the signature of the trusted third party TP, the entity A sends the message 4 to the entity B; otherwise, the authentication process ends.

Specifically the entity B can verify the message 4 and determine from the verification result the legality of the entity A particularly in the following step a to step c:

a. The entity B verifies whether the signature of the trusted third party TP is valid and determines whether a random number $R_B$ generated by the entity B in the message 1 is consistent with a random number $R_B$ included in the signature of the trusted third party TP, and if both are positive, then the entity B performs the step b; otherwise, the entity B determines the entity A as being illegal and can further send a subsequent message 5;

b. If the entity B determines, from $Res_{GA}$, the group GA as being legal and valid, then the entity B performs the step c; otherwise, the entity B determines the entity A as being illegal and can further send the subsequent message 5; and c. The entity B obtains a public key of the group GA by $I_{GA}$, verifies, against the public key, whether the signature of the entity A is valid, determines whether a distinguishing identifier of a group GB is consistent with a group distinguishing identifier GB included in the signature of the entity A and determines whether the random number $R_B$ generated by the entity B in the message 1 is consistent with a random number $R_B$ included in the signature of the entity A, and if all are positive, then the entity B determines the entity A as being legal; otherwise, the entity B determines the entity A as being illegal.

Furthermore the message 1 further includes an identity $I_{GB}$ of a group GB where the entity B resides; and the message 2 further include $I_{GB}$, the trusted third party TP further verifies the group GB against $I_{GB}$ for legality, and the message 3 further includes a verification result $Res_{GB}$ of the group GB; and Correspondingly in the step 14, after the entity B determines from the verification result the legality of the entity A, the entity B sends the message 5 to the entity A, where the message 5 includes a third token including a signature of the entity B; and the entity A verifies the message 5 upon reception of the message 5 and determines from a verification result the legality of the entity B.

Specifically the entity A can verify the message 5 and determine from the verification result the legality of the entity B particularly in the following two approaches:

In a first approach, there are the following step a to step c:

a. The entity A verifies whether the signature of the trusted third party TP is valid and determines whether the random number $R'_A$ generated by the entity A in the message 2 is consistent with the random number $R'_A$ included in the signature of the trusted third party TP; and if they are consistent, then the entity A performs the step b; otherwise, the entity A determines the entity B as being illegal, and the flow ends;

b. If the entity A determines, from $Res_{GB}$, the group GB as being legal and valid, then the entity A performs the step c; otherwise, the entity A determines the entity B as being illegal, and the flow ends; and c. The entity A obtains a public key of the group GB by $I_{GB}$, verifies against the public key whether the signature of the entity B is valid, determines whether a distinguishing identifier of the group GA is consistent with a group distinguishing identifier GA included in the signature of the entity B and determines whether a random number $R_A$ generated by the entity A in the message 4 is consistent with a random number $R_A$ included in the signature of the entity B, and if all are positive, then the entity A determines the entity B as being legal; otherwise, the entity A determines the entity B as being illegal.

In a second approach, before the entity A sends the message 4 to the entity B, firstly the entity A can verify whether the signature of the trusted third party TP is valid and determine whether the random number $R'_A$ generated by the entity A in the message 2 is consistent with the random number $R'_A$ included in the signature of the trusted third party TP; and when the signature of the trusted third party TP is verified as being valid and the random number $R'_A$ generated by the entity A in the message 2 is determined as being consistent with the random number $R'_A$ included in the signature of the trusted third party TP, then the entity A sends the message 4 to the entity B; and Correspondingly the entity A can verify the entity B for legality particularly in the following step a to step b:

a. If the entity A determines from $Res_{GB}$ the group GB as being legal and valid, then the entity A performs the step b; otherwise, the entity A determines the entity B as being illegal, and the flow ends; and b. The entity A obtains a public key of the group GB by $I_{GB}$, verifies, against the public key, whether the signature of the entity B is valid, determines whether a distinguishing identifier of the group GA is consistent with a group distinguishing identifier GA included in the signature of the entity B and determines whether a random number $R_A$ generated by the entity A in the message 4 is consistent with a random number $R_A$ included in the signature of the entity B, and if all are positive, then the entity A determines the entity B as being legal; otherwise, the entity A determines the entity B as being illegal.

The trusted third party TP can verify the group GA against $I_{GA}$ for legality particularly in the following two approaches:

In a first approach, if $I_{GA}$ in the message 2 is the distinguishing identifier GA of the group GA, then the trusted third party TP searches for a valid public key $PublicKey_{GA}$ of the group GA, and if it is found, then the trusted third party TP determines GA as being legal; otherwise, the trusted third party TP determines GA as being illegal; and In a second approach, if $I_{GA}$ in the message 2 is a certificate $Cert_{GA}$ of the group GA, then the trusted third party TP checks the certificate $Cert_{GA}$ for validity $Valid_{GA}$, and if $Cert_{GA}$ is valid, then the trusted third party TP determines GA as being legal; otherwise, the trusted third party TP determines GA as being illegal.

Alike the trusted third party TP can verify the group GB against $I_{GB}$ for legality particularly in the following two approaches:

In a first approach, if $I_{GB}$ in the message 2 is the distinguishing identifier GB of the group GB, then the trusted third party TP searches for a valid public key $PublicKey_{GB}$ of the group GB, and if it is found, then the trusted third party TP determines GB as being legal; otherwise, the trusted third party TP determines the GB as being illegal; and In a second approach, if $I_{GB}$ in the message 2 is a certificate $Cert_{GB}$ of the group GB, then the trusted third party TP checks the certificate $Cert_{GB}$ for validity $Valid_{GB}$, and if $Cert_{GB}$ is valid, then the trusted third party TP determines GB as being legal; otherwise, the trusted third party TP determines the GB as being illegal.

In this method, the first token can include a token TokenTA, or the first token includes tokens TokenTA1 and TokenTA2, where TokenTA includes a signature of the trusted third party TP on a message including $R'_A$, $R_B$, $Res_{GB}$ and $Res_{GA}$, TokenTA1 includes a signature of the trusted third party TP on a message including $R'_A$ and $Res_{GB}$, and TokenTA2 includes a signature of the trusted third party TP on a message including $R_B$ and $Res_{GA}$; and $R'_A$ is the random number generated by the entity A included in the message 2, that is, the message 2 can further include the random number generated by the entity A; and $R_B$ is the random number generated by the entity B included in the message 1, and the message 2 also carries $R_B$.

For example, TokenTA=$sS_T(R'_A\|R_B\|Res_{GB}\|Res_{GA}\|Text3)$, where Text3 is an optional text, and $sS_T$ is the signature of the trusted third party TP.

TokenTA1=$sS_T(R'_A\|Res_{GB}\|Text4)$ and TokenTA2=$sS_T(R_B\|Res_{GA}\|Text3)$, where Text3 is an optional text, and $sS_T$ is the signature of the trusted third party TP.

The second token includes a token TokenAB including $R_A$, $R'_A$, $Res_{GB}$, $Res_{GA}$, TokenTA and a signature of the entity A on a message including GA, $R_A$, GB, $R_B$, $Res_{GB}$, $Res_{GA}$ and TokenTA; or The second token includes $R_A$, $Res_{GA}$, TokenTA2 and a signature of the entity A on a message including GA, $R_A$, GB, $R_B$ and TokenTA2; and $R_A$ is the random number generated by the entity A included in the message 4. For example:

TokenAB=$R_A\|R'_A\|Text7\|Res_{GB}\|Res_{GA}\|TokenTA\|sS_A(GA\|R_A\|GB\|R_B\|Res_{GB}\|Res_{GA}\|TokenTA\|Text6)$, where Text6 and Text7 are optional texts, and $sS_A$ is the signature of the entity A; or TokenAB=$R_A\|Res_{GA}\|Text7\|TokenTA2\|sS_A(GA\|R_A\|GB\|R_B\|TokenTA2\|Text6)$, where Text6 and Text7 are optional texts, and $sS_A$ is the signature of the entity A;

The third token includes TokenBA including a signature of the entity B on a message including GB, $R_B$, GA and $R_A$; and $R_A$ is the random number generated by the entity A included in the message 4, that is, the message 4 can further include the random number generated by the entity A; and $R_B$ is the random number generated by the entity B included in the message 1, that is, the message 1 can further include the random number generated by the entity B.

For example, TokenBA=$Text9\|sS_B(GB\|R_B\|GA\|R_A\|Text8)$, where Text8 and Text9 are optional texts, and $sS_B$ is the signature of the entity B.

In the invention, the message 1, the message 2 and the message 3 further include optional texts respectively. The various random numbers carried in the messages can be replaced with time labels or sequence numbers.

First Embodiment

Figure 2:
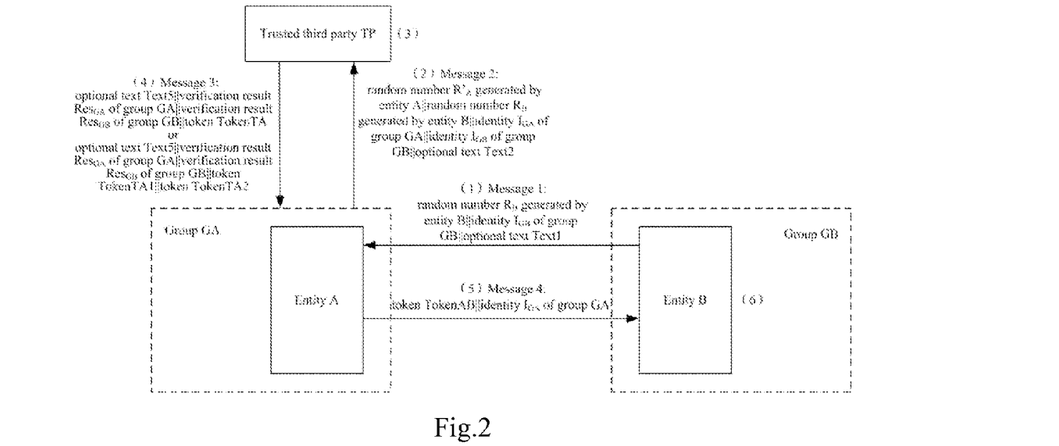
FIG. 2 is a schematic diagram of a preferred implementation of an anonymous entity authentication system according to a first embodiment of the invention.

Referring to FIG. 2, this embodiment includes a flow of only anonymous authentication on an entity A by an entity B, particularly as follows:

Step (1): The entity B sends a message 1 to the entity A, where the message 1 includes a random number $R_B$ generated by the entity B, an identity $I_{GB}$ of a group GB and an optional text Text1.

Step (2): The entity A sends a message 2 to a trusted third party TP, where the message 2 includes $R_B$, a random number $R'_A$ generated by the entity A, an identity $I_{GA}$ of a group GA, the identity $I_{GB}$ of the group GB and an optional text Text2.

Step (3): The trusted third party TP checks the group GA and the group GB against the identities $I_{GA}$ and $I_{GB}$ for legality upon reception of the message 2.

The trusted third party TP can check the group GA and the group GB for legality particularly in the following several approaches:

In the message 2, if the identity $I_{GA}$ of the group GA is a distinguishing identifier GA of the group GA, then the trusted third party TP searches for a valid public key $PublicKey_{GA}$ of the group GA, or if the identity $I_{GA}$ of the group GA is a certificate $Cert_{GA}$ of the group GA, then the trusted third party TP checks the certificate $Cert_{GA}$ for validity $Valid_{GA}$; and if the identity $I_{GB}$ of the group GB is a distinguishing identifier GB of the group GB, then the trusted third party TP searches for a valid public key PublicKey$_{GB}$ of the group GB, or if the identity I$_{GB}$ of the group GB is a certificate Cert$_{GB}$ of the group GB, then the trusted third party TP checks the certificate Cert$_{GB}$ for validity Valid$_{GB}$.

Step (4): The trusted third party TP returns a message 3 to the entity A after checking the group GA and the group GB for legality, where the message 3 includes group verification results Res$_{GA}$ and Res$_{GB}$, a token TokenTA and an optional text Text5 or includes group verification results Res$_{GA}$ and Res$_{GB}$, tokens TokenTA1 and TokenTA2 and an optional text Text5. Particularly TokenTA includes a signature of the trusted third party TP on a message including R'$_A$, R$_B$, Res$_{GB}$ and Res$_{GA}$, TokenTA1 includes a signature of the trusted third party TP on a message including R'$_A$ and Res$_{GB}$, and TokenTA2 includes a signature of the trusted third party TP on a message including R$_B$ and Res$_{GA}$. A preferred embodiment of Token according to the invention is TokenTA=sS$_T$(R'$_A$||R$_B$||Res$_{GB}$||Res$_{GA}$||Text3). A preferred embodiment of TokenTA1 and TokenTA2 according to the invention is TokenTA1=sS$_T$(R'$_A$||Res$_{GB}$||Text4) and TokenTA2=sS$_T$(R$_B$||Res$_{GA}$||Text3).

Step (5): The entity A sends a message 4 to the entity B upon reception of the message 3, where the message 4 includes a token TokenAB and the group identity I$_{GA}$. Particularly TokenAB includes R$_A$, R'$_A$, Res$_{GB}$, Res$_{GA}$, TokenTA and a signature of the entity A on a message including GA, R$_A$, GB, R$_B$, Res$_{GB}$, Res$_{GA}$ and TokenTA, and a preferred embodiment according to the invention is TokenAB=R$_A$||R'$_A$||Text7||Res$_{GB}$||Res$_{GA}$||TokenTA||sS$_A$(GA||R$_A$||GB||R$_B$||Res$_{GB}$||Res$_{GA}$||TokenTA||Text6); or TokenAB includes R$_A$, Res$_{GA}$, TokenTA2 and a signature of the entity A on a message including GA, R$_A$, GB, R$_B$ and TokenTA2, and a preferred embodiment according to the invention is TokenAB=R$_A$||Res$_{GA}$||Text7||TokenTA2||sS$_A$(GA||R$_A$||GB||R$_B$||TokenTA2||Text6).

Step (6): The entity B verifies the message 4 upon reception of the message 4. A verification process is as follows:

Step (6.1): The entity B verifies against a public key of the trusted third party TP whether the signature of the trusted third party TP included in TokenTA or TokenTA2 in Token AB is valid and determines whether the random number R$_B$ generated by the entity B in the message 1 is consistent with the random number R$_B$ in the signature of the trusted third party TP included in TokenTA or TokenTA2, and if so, then the entity B performs the step (6.2); otherwise, the entity B determines the entity A as being illegal;

Step (6.2): The entity B obtains the verification result Res$_{GA}$ of the group GA, and if the entity B determines from Res$_{GA}$ the group GA as being legal and valid, then the entity B performs the step (6.3); otherwise, the entity B determines the entity A as being illegal; and Step (6.3): The entity B obtains the public key of the group GA, verifies against the public key whether the signature of the entity A in TokenAB is valid, determines whether the distinguishing identifier of the group GB is consistent with the group distinguishing identifier (GB) included in the signature of the entity A in TokenAB and determines whether the random number R$_B$ generated by the entity B in the message 1 is consistent with the random number R$_B$ included in the signature of the entity A in TokenAB, and if so, then the entity B determines the entity A as being legal; otherwise, the entity B determines the entity A as being illegal. The entity B finishes the authentication on the entity A.

Second Embodiment

Figure 3:
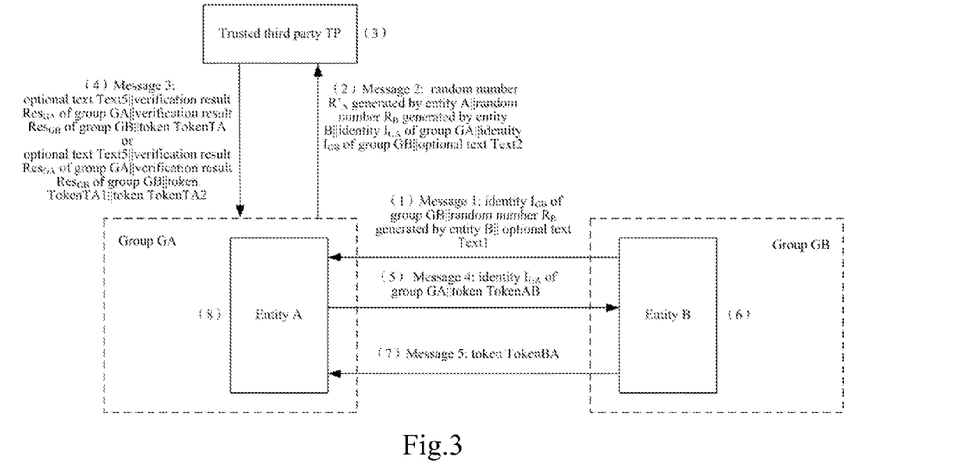
FIG. 3 is a schematic diagram of a preferred implementation of an anonymous entity authentication system according to a second embodiment of the invention.

Referring to FIG. 3, a specific flow of anonymous authentication between an entity A and an entity B is as follows:

Step (1): The entity B sends a message 1 to the entity A, where the message 1 includes a random number R$_B$ generated by the entity B, an identity I$_{GB}$ of a group GB and an optional text Text1.

Step (2): The entity A sends a message 2 to a trusted third party TP upon reception of the message 1, where the message 2 includes R$_B$, a random number R'$_A$ generated by the entity A, an identity I$_{GA}$ of a group GA, the identity I$_{GB}$ of the group GB and an optional text Text2.

Step (3): The trusted third party TP checks the group GA and the group GB against the identities I$_{GA}$ and I$_{GB}$ for legality upon reception of the message 2.

The trusted third party TP can check the group GA and the group GB for legality particularly in the following several approaches:

In the message 2, if the identity I$_{GA}$ of the group GA is a distinguishing identifier GA of the group GA, then the trusted third party TP searches for a valid public key PublicKey$_{GA}$ of the group GA, or if the identity I$_{GA}$ of the group GA is a certificate Cert$_{GA}$ of the group GA, then the trusted third party TP checks the certificate Cert$_{GA}$ for validity Valid$_{GA}$; and if the identity I$_{GB}$ of the group GB is a distinguishing identifier GB of the group GB, then the trusted third party TP searches for a valid public key PublicKey$_{GB}$ of the group GB, or if the identity I$_{GB}$ of the group GB is a certificate Cert$_{GB}$ of the group GB, then the trusted third party TP checks the certificate Cert$_{GB}$ for validity Valid$_{GB}$.

Step (4): The trusted third party TP returns a message 3 to the entity A after checking the group GA and the group GB for legality, where the message 3 includes group verification results Res$_{GA}$ and Res$_{GB}$, a token TokenTA and an optional text Text5 or includes group verification results Res$_{GA}$ and Res$_{GB}$, tokens TokenTA1 and TokenTA2 and an optional text Text5. Particularly TokenTA includes a signature of the trusted third party TP on a message including R'$_A$, R$_B$, Res$_{GB}$ and Res$_{GA}$, TokenTA1 includes a signature of the trusted third party TP on a message including R'$_A$ and Res$_{GB}$, and TokenTA2 includes a signature of the trusted third party TP on a message including R$_B$ and Res$_{GA}$. A preferred embodiment of Token according to the invention is TokenTA=sS$_T$(R'$_A$||R$_B$||Res$_{GB}$||Res$_{GA}$||Text3). A preferred embodiment of TokenTA1 and TokenTA2 according to the invention is TokenTA1=sS$_T$(R'$_A$||Res$_{GB}$||Text4) and TokenTA2=sS$_T$(R$_B$||Res$_{GA}$||Text3).

Step (5): The entity A sends a message 4 to the entity B upon reception of the message 3, where the message 4 includes a token TokenAB and the group identity I$_{GA}$. Particularly TokenAB includes R$_A$, R'$_A$, Res$_{GB}$, Res$_{GA}$, TokenTA and a signature of the entity A on a message including GA, R$_A$, GB, R$_B$, Res$_{GB}$, Res$_{GA}$ and TokenTA, and a preferred embodiment according to the invention is TokenAB=R$_A$||R'$_A$||Text7||Res$_{GB}$||Res$_{GA}$||TokenTA||sS$_A$(GA||R$_A$||GB||R$_B$||Res$_{GB}$||Res$_{GA}$||TokenTA||Text6); or TokenAB includes R$_A$, Res$_{GA}$, TokenTA2 and a signature of the entity A on a message including GA, R$_A$, GB, R$_B$ and TokenTA2, and a preferred embodiment according to the invention is TokenAB=R$_A$||Res$_{GA}$||Text7||TokenTA2||sS$_A$(GA||R$_A$||GB||R$_B$||TokenTA2||Text6).

Step (6): The entity B verifies the message 4 upon reception of the message 4. A verification process is as follows:

Step (6.1): The entity B verifies against a public key of the trusted third party TP whether the signature of the trusted third party TP included in TokenTA or TokenTA2 in Token AB is valid and determines whether the random number R$_B$ generated by the entity B in the message 1 is consistent with the random number R$_B$ included in the signature of the trusted third party TP in TokenTA or TokenTA2, and if so, then the entity B performs the step (6.2); otherwise, the entity B determines the entity A as being illegal and terminates the authentication flow or performs the step (7);

Step (6.2): The entity B obtains the verification result $Res_{GA}$ of the group GA, and if the entity B determines from $Res_{GA}$ the group GA as being legal and valid, then the entity B performs the step (6.3); otherwise, the entity B determines the entity A as being illegal and terminates the authentication flow or performs the step (7); and Step (6.3): The entity B obtains the public key of the group GA, verifies against the public key whether the signature of the entity A in TokenAB is valid, determines whether the distinguishing identifier of the group GB is consistent with the group distinguishing identifier (GB) included in the signature of the entity A in TokenAB and determines whether the random number $R_B$ generated by the entity B in the message 1 is consistent with the random number $R_B$ included in the signature of the entity A in TokenAB, and if so, then the entity B determines the entity A as being legal; otherwise, the entity B determines the entity A as being illegal. The entity B finishes the authentication on the entity A and performs the step (7).

Step (7): The entity B sends a message 5 to the entity A, where the message 5 includes a token TokenBA. TokenBA includes a signature of the entity B on a message including GB, $R_B$, GA and $R_A$. A preferred embodiment of TokenBA according to the invention is TokenBA=Text9$\|sS_B$(GB$\|R_B\|$GA$\|R_A\|$Text8).

Step (8): The entity A verifies the message 5 upon reception of the message 5. A verification process is as follows:

Step (8.1): The entity A verifies against the public key of the trusted third party TP whether the signature of the trusted third party TP in TokenTA or TokenTA1 in the message 3 is valid and determines whether the random number $R'_A$ generated by the entity A in the message 2 is consistent with the random number $R'_A$ included in the signature of the trusted third party TP in TokenTA or TokenTA1, and if so, then the entity B performs the step (8.2); otherwise, the entity A determines the entity B as being illegal;

Step (8.2): The entity A obtains the verification result $Res_{GB}$ of the group GB, and if the entity A determines from $Res_{GB}$ the group GB as being legal and valid, then the entity B performs the step (8.3); otherwise, the entity A determines the entity B as being illegal and finishes the authentication on the entity B; and Step (8.3): The entity A obtains the public key of the group GB, verifies against the public key whether the signature of the entity B in TokenBA is valid, determines whether the distinguishing identifier of the group GA is consistent with the group distinguishing identifier (GA) included in the signature of the entity B in Token BA and determines whether the random number $R'_A$ generated by the entity A in the message 4 is consistent with the random number $R_A$ included in the signature of the entity B in TokenBA, and if so, then the entity A determines the entity B as being legal; otherwise, the entity A determines the entity B as being illegal. The entity A finishes the authentication on the entity B.

Particularly in the step (4), when the message 3 includes the verification results $Res_{GA}$ and $Res_{GB}$, the token TokenTA and an option text Text5, the step (8.1) can be earlier performed in the step (5), that is, upon reception of the message 3, the entity A firstly performs the step (8.1) and then sends the message 4 to the entity B after the verification is passed.

The random number $R_A$, $R'_A$ and $R_B$ can be replaced with time labels or sequence numbers.

With the foregoing bidirectional anonymous authentication process between the entity A and the entity B, bidirectional identity legality authentication between the two entities can be performed while protecting identity information of the two entities from being disclosed.

The presence and contents of the optional texts Text1, Text2, Text3, . . . , as referred to in the foregoing embodiments are indeterminate in view of the possibility for those skilled in the art to define the contents of the optional texts as they desire for the purpose of extending the optional texts, and thus the optional texts may be omitted in other embodiments.

Figure 4:
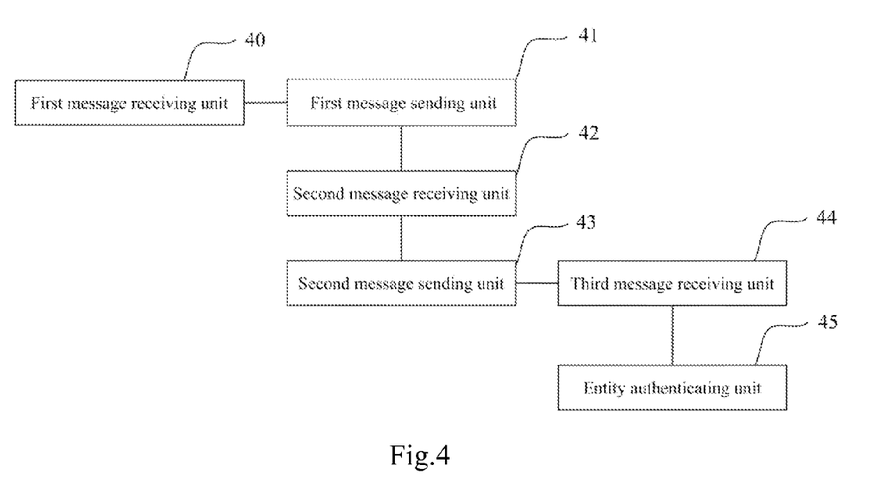
FIG. 4 is a schematic structural diagram of an anonymous entity authentication apparatus according to an embodiment of the invention.

Referring to FIG. 4, an embodiment of the invention further provides an anonymous entity authentication apparatus, and the apparatus includes:

A first message receiving unit 40 configured to receive a message 1 sent by an entity B;

A first message sending unit 41 configured to send a message 2 to a trusted third party TP, where the message 2 includes an identity $I_{GA}$ of a group GA where the anonymous entity authentication apparatus resides;

A second message receiving unit 42 configured to receive a message 3 returned from the trusted third party TP, where the message 3 includes a verification result $Res_{GA}$ of the group GA and a first token including a signature of the trusted third party TP; and A second message sending unit 43 configured to send a message 4 to the entity B upon reception of the message 3, where the message 4 includes $I_{GA}$ and a second token including $Res_{GA}$, the first token and a signature of the entity A.

Furthermore the second message sending unit is configured:

To determine whether a random number $R'_A$ generated by the entity A in the message 2 is consistent with a random number $R'_A$ included in the signature of the trusted third party TP before sending the message 4 to the entity B; and when they are consistent, to send the message 4 to the entity B.

Furthermore the message 1 received by the first message receiving unit further includes an identity $I_{GB}$ of a group GB where the entity B resides; and the message 2 sent by the first message sending unit further include $I_{GB}$, and the message 3 received by the second message receiving unit further includes a verification result $Res_{GB}$ of the group GB; and the apparatus further includes:

A third message receiving unit 44 configured to receive a message 5 sent by the entity B after the message 4 is sent to the entity B, where the message 5 includes a third token including a signature of the entity B; and An entity authenticating unit 45 configured to verify the message 5 upon reception of the message 5 and to determine from a verification result the legality of the entity B.

The entity authenticating unit 45 is configured:

a. To verify whether the signature of the trusted third party TP is valid and to determine whether the random number $R'_A$ generated by the anonymous entity authentication apparatus in the message 2 is consistent with the random number $R'_A$ included in the signature of the trusted third party TP; and if they are consistent, to perform the step b; otherwise, to determine the entity B as being illegal and end the flow;

b. If the group GB is determined from $Res_{GB}$ as being legal and valid, to perform the step c; otherwise, to determine the entity B as being illegal and end the flow; and c. To obtain a public key of the group GB by $I_{GB}$, to verify against the public key whether the signature of the entity B is valid, to determine whether a distinguishing identifier of the group GA is consistent with a group distinguishing identifier GA included in the signature of the entity B and to determine whether a random number $R_A$ generated by the entity A in the message 4 is consistent with a random number $R_A$ included in the signature of the entity B, and if all are positive, to determine the entity B as being legal; otherwise, to determine the entity B as being illegal.

Furthermore the first token includes a token TokenTA, or the first token includes tokens TokenTA1 and TokenTA2, where:

TokenTA includes a signature of the trusted third party TP on a message including $R'_A$, $R_B$, $Res_{GB}$ and $Res_{GA}$, TokenTA1 includes a signature of the trusted third party TP on a message including $R'_A$ and $Res_{GB}$, and TokenTA2 includes a signature of the trusted third party TP on a message including $R_B$ and $Res_{GA}$; and $R'_A$ is the random number generated by the entity A included in the message 2; and $R_B$ is the random number generated by the entity B included in the message 1, and the message 2 also carries $R_B$.

Furthermore TokenTA=$sS_T(R'_A\|R_B\|Res_{GB}\|Res_{GA}\|Text3)$, where Text3 is an optional text, and $sS_T$ is the signature of the trusted third party TP.

Furthermore TokenTA1=$sS_T(R'_A\|Res_{GB}\|Text4)$ and TokenTA2=$sS_T(R_B\|Res_{GA}\|Text3)$, where Text3 is an optional text, and $sS_T$ is the signature of the trusted third party TP.

Furthermore the second message sending unit 43 is further configured:

If the first token includes the token TokenTA, to verify whether the signature of the trusted third party TP is valid and to determine whether the random number $R'_A$ generated by the entity A in the message 2 is consistent with the random number $R'_A$ included in the signature of the trusted third party TP before sending the message 4 to the entity B; and To send the message 4 to the entity B when the signature of the trusted third party TP is verified as being valid and the random number $R'_A$ generated by the entity A in the message 2 is determined as being consistent with the random number $R'_A$ included in the signature of the trusted third party TP.

Furthermore the entity authenticating unit 45 is configured:

a. If the group GB is determined from $Res_{GB}$ as being legal and valid, to perform the step b; otherwise, to determine the entity B as being illegal and end the flow; and b. To obtain a public key of the group GB by $I_{GB}$, to verify against the public key whether the signature of the entity B is valid, to determine whether a distinguishing identifier of the group GA is consistent with a group distinguishing identifier GA included in the signature of the entity B and to determine whether a random number $R_A$ generated by the entity A in the message 4 is consistent with a random number $R_A$ included in the signature of the entity B, and if all are positive, to determine the entity B as being legal; otherwise, to determine the entity B as being illegal.

Furthermore the second token includes a token TokenAB including $R_A$, $R'_A$, $Res_{GB}$, $Res_{GA}$, TokenTA and a signature of the entity A on a message including GA, $R_A$, GB, $R_B$, $Res_{GB}$, $Res_{GA}$ and TokenTA; or The second token includes $R_A$, $Res_{GA}$, TokenTA2 and a signature of the entity A on a message including GA, $R_A$, GB, $R_B$ and TokenTA2; and $R_A$ is the random number generated by the entity A included in the message 4.

Furthermore TokenAB=$R_A\|R'_A\|Text7\|Res_{GB}\|Res_{GA}\|TokenTA\|sS_A$ (GA$\|R_A\|$GB$\|R_B\|Res_{GB}\|Res_{GA}\|$TokenTA$\|$Text6), where Text6 and Text7 are optional texts, and $sS_A$ is the signature of the entity A.

Furthermore TokenAB=$R_A\|Res_{GA}\|Text7\|TokenTA2\|sS_A$ (GA$\|R_A\|$GB$\|R_B\|$TokenTA2$\|$Text6), where Text6 and Text7 are optional texts, and $sS_A$ is the signature of the entity A;

Furthermore the third token includes TokenBA including a signature of the entity B on a message including GB, $R_B$, GA and $R_A$; and $R_A$ is the random number generated by the entity A included in the message 4; and $R_B$ is the random number generated by the entity B included in the message 1.

Furthermore TokenBA=Text9$\|sS_B$ (GB$\|R_B\|$GA$\|R_A\|$Text8), where Text8 and Text9 are optional texts, and $sS_B$ is the signature of the entity B.

Furthermore the message 1, the message 2 and the message 3 further include optional texts respectively.

Furthermore the random numbers are replaced with time labels or sequence numbers.

Figure 5:
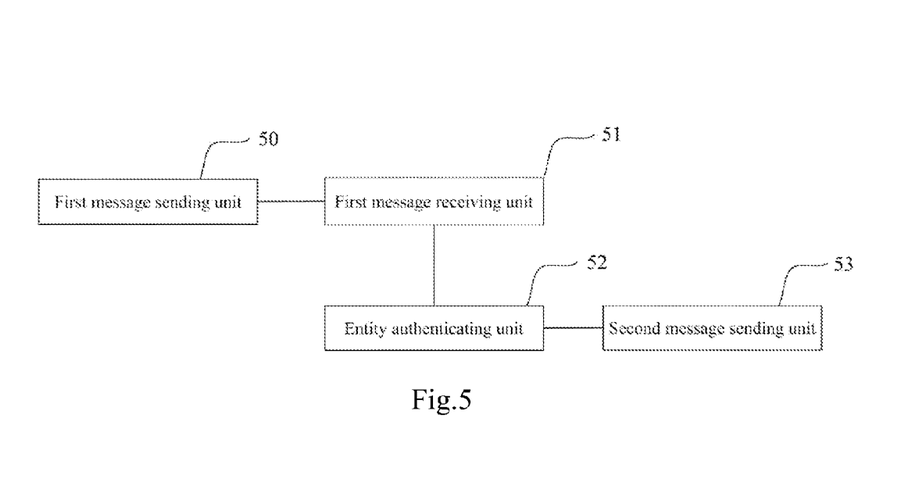
FIG. 5 is a schematic structural diagram of another anonymous entity authentication apparatus according to an embodiment of the invention.

Referring to FIG. 5, an embodiment of the invention further provides another anonymous entity authentication apparatus, and the apparatus includes:

A first message sending unit 50 configured to send a message 1 to an entity A to initiate an authentication process;

A first message receiving unit 51 configured to receive a message 4 sent by the entity A, where the message 4 includes an identity $I_{GA}$ of a group GA and a second token including a verification result $Res_{GA}$ of a trusted third party TP on the group GA, a first token and a signature of the entity A, and the first token includes a signature of the trusted third party TP; and An entity authenticating unit 52 configured to verify the message 4 upon reception of the message 4 and to determine from a verification result the legality of the entity A.

Furthermore the apparatus further includes:

A second message sending unit 53 configured to send a message 5 to the entity A after determining from the verification result the legality of the entity A, where the message 5 includes a third token including a signature of the entity B.

Furthermore the entity authenticating unit 52 is configured:

a. To verify whether the signature of the trusted third party TP is valid and to determine whether a random number $R_B$ generated by the anonymous entity authentication apparatus in the message 1 is consistent with a random number $R_B$ included in the signature of the trusted third party TP; and if both are positive, to perform the step b; otherwise, to determine the entity A as being illegal;

b. If the group GA is determined from $Res_{GA}$ as being legal and valid, to perform the step c; otherwise, to determine the entity A as being illegal; and c. To obtain a public key of the group GA by $I_{GA}$, to verify against the public key whether the signature of the entity A is valid, to determine whether a distinguishing identifier of the group GB is consistent with a group distinguishing identifier GB included in the signature of the entity A and to determine whether the random number $R_B$ generated by the entity B in the message 1 is consistent with a random number $R_B$ included in the signature of the entity AB, and if all are positive, to determine the entity A as being legal; otherwise, to determine the entity A as being illegal.

Furthermore the first token includes a token TokenTA, or the first token includes tokens TokenTA1 and TokenTA2, where:

TokenTA includes a signature of the trusted third party TP on a message including $R'_A$, $R_B$, $Res_{GB}$ and $Res_{GA}$, TokenTA1 includes a signature of the trusted third party TP on a message including $R'_A$ and $Res_{GB}$, and TokenTA2 includes a signature of the trusted third party TP on a message including $R_B$ and $Res_{GA}$; and $R'_A$ is a random number generated by the entity A included in a message 2; and $R_B$ is the random number generated by the entity B included in the message 1, and the message 2 is a message, including the identity $I_{GA}$ of the group GA, sent to the trusted third party TP by the entity A upon reception of the message 1.

Furthermore TokenTA=$sS_T(R'_A\|R_B\|Res_{GB}\|Res_{GA}\|Text3)$, where Text3 is an optional text, and $sS_T$ is the signature of the trusted third party TP.

Furthermore TokenTA1=$sS_T(R'_A\|Res_{GB}\|Text4)$ and TokenTA2=$sS_T(R_B\|Res_{GA}\|Text3)$, where Text3 is an optional text, and $sS_T$ is the signature of the trusted third party TP.

Furthermore the second token includes a token TokenAB including $R_A$, $R'_A$, $Res_{GB}$, $Res_{GA}$, TokenTA and a signature of the entity A on a message including GA, $R_A$, GB, $R_B$, $Res_{GB}$, $Res_{GA}$ and TokenTA; or The second token includes $R_A$, $Res_{GA}$, TokenTA2 and a signature of the entity A on a message including GA, $R_A$, GB, $R_B$ and TokenTA2; and $R_A$ is a random number generated by the entity A included in the message 4.

Furthermore TokenAB=$R_A\|R'_A\|Text7\|Res_{GB}\|Res_{GA}\|TokenTA\|sS_A$ (GA$\|R_A\|$GB$\|R_B\|Res_{GB}\|Res_{GA}\|$TokenTA$\|$Text6), where Text6 and Text7 are optional texts, and $sS_A$ is the signature of the entity A.

Furthermore TokenAB=$R_A\|Res_{GA}\|Text7\|TokenTA2\|sS_A$ (GA$\|R_A\|$GB$\|R_B\|$TokenTA2$\|$Text6), where Text6 and Text7 are optional texts, and $sS_A$ is the signature of the entity A;

Furthermore the third token includes TokenBA including a signature of the entity B on a message including GB, $R_B$, GA and $R_A$; and $R_A$ is the random number generated by the entity A included in the message 4; and $R_B$ is the random number generated by the entity B included in the message 1.

Furthermore TokenBA=$Text9\|sS_B$ (GB$\|R_B\|$GA$\|R_A\|$Text8), where Text8 and Text9 are optional texts, and $sS_B$ is the signature of the entity B.

Furthermore the message 1 further includes an optional text.

Furthermore the random numbers are replaced with time labels or sequence numbers.

Figure 6:
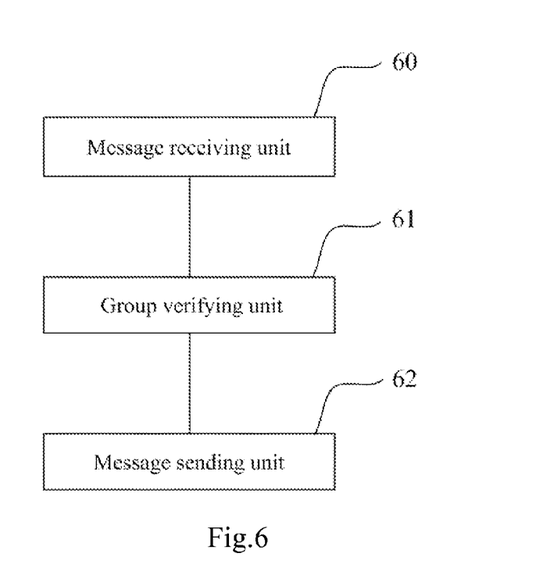
FIG. 6 is schematic structural diagram of a trusted third party apparatus according to an embodiment of the invention.

Referring to FIG. 6, an embodiment of the invention further provides a trusted third party apparatus including:

A message receiving unit 60 configured to receive a message 2 sent by an entity A, where the message 2 includes an identity $I_{GA}$ of a group GA where the entity A resides;

A group verifying unit 61 configured to verify the group GA against $I_{GA}$ for legality upon reception of the message 2; and A message receiving unit 62 configured to return a message 3 to the entity A, where the message 3 includes a verification result $Res_{GA}$ of the group GA and a first token including a signature of the trusted third party apparatus.

Furthermore the group verifying unit 61 is further configured:

When the message 2 further include $I_{GB}$, to verify a group GB against $I_{GB}$ for legality, where the message 3 further includes a verification result $Res_{GB}$ of the group GB.

Furthermore the group verifying unit 61 is further configured:

If $I_{GA}$ in the message 2 is a distinguishing identifier GA of the group GA, to search for a valid public key PublicKey$_{GA}$ of the group GA, and if it is found, to determine GA as being legal; otherwise, to determine GA as being illegal; and If $I_{GA}$ in the message 2 is a certificate Cert$_{GA}$ of the group GA, to check the certificate Cert$_{GA}$ for validity Valid$_{GA}$, and if Cert$_{GA}$ is valid, to determine GA as being legal; otherwise, to determine GA as being illegal.

Furthermore the group verifying unit 61 is further configured:

if $I_{GB}$ in the message 2 is a distinguishing identifier GB of the group GB, to search for a valid public key PublicKey$_{GB}$ of the group GB, and if it is found, to determine GB as being legal; otherwise, to determine GB as being illegal; and If $I_{GB}$ in the message 2 is a certificate Cert$_{GB}$ of the group GB, to check the certificate Cert$_{GB}$ for validity Valid$_{GB}$, and if Cert$_{GB}$ is valid, to determine GB as being legal; otherwise, to determine GB as being illegal.

Furthermore the first token includes a token TokenTA, or the first token includes tokens TokenTA1 and TokenTA2, where:

TokenTA includes a signature of the trusted third party TP on a message including $R'_A$, $R_B$, $Res_{GB}$ and $Res_{GA}$, TokenTA1 includes a signature of the trusted third party TP on a message including $R'_A$ and $Res_{GB}$, and TokenTA2 includes a signature of the trusted third party TP on a message including $R_B$ and $Res_{GA}$; and $R'_A$ is a random number generated by the entity A included in the message 2; $R_B$ is a random number generated by an entity B included in a message 1; and the message 1 is a message, including $I_{GB}$, sent by the entity B to the entity A.

Furthermore TokenTA=$sS_T(R'_A\|R_B\|Res_{GB}\|Res_{GA}\|Text3)$, where Text3 is an optional text, and $sS_T$ is the signature of the trusted third party TP.

Furthermore TokenTA1=$sS_T(R'_A\|Res_{GB}\|Text4)$ and TokenTA2=$sS_T(R_B\|Res_{GA}\|Text3)$, where Text3 is an optional text, and $sS_T$ is the signature of the trusted third party TP.

Although the preferred embodiments of the invention have been described, those skilled in the art benefiting from the underlying inventive concept can make additional modifications and variations to these embodiments. Therefore the appended claims are intended as being construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An anonymous entity authentication method, comprising
the steps of:
an entity B sending a first message to an entity A to initiate an authentication process;
the entity A sending a second message to a trusted third party TP, wherein the second message comprises an identity $I_{GA}$ of a group GA where the entity A resides, and an identity of the entity A is different from the identity to $I_{GA}$ of the group GA where the entity A resides;
the trusted third party TP verifying the group GA against $I_{GA}$ for legality upon reception of the second message; and returning a third message to the entity A, wherein the third message comprises a verification result $Res_{GA}$ of the group GA and a first token comprising a signature of the trusted third party TP;
the entity A sending a fourth message to the entity B upon reception of the third message, wherein the fourth message comprises IGA and a second token comprising $Res_{GA}$, the first token and a signature of the entity A; and the entity B verifying the fourth message upon reception of the fourth message and determining from a verification result the legality of the entity A, wherein the entity B verifying the fourth message and determining from the verification result in the legality of the entity A further comprises:

a) the entity B verifying whether the signature of the trusted third party TP is valid and determining whether a random number $R_B$ generated by the entity B in the first message is consistent with a random number $R_B$ comprised in the signature of the trusted third party TP, and if both are positive, then performing the step b; otherwise, determining the entity A as being illegal;

b) if the entity B determines from $Res_{GA}$, the group GA as being legal and valid, then performing the step c; otherwise, determining the entity A as being illegal; and c) the entity B obtaining a public key of the group GA by $I_{GA}$, verifying against the public key whether the signature of the entity A is valid, determining whether a distinguishing identifier of the group GB is consistent with a group distinguishing identifier GB comprised in the signature of the entity A and determining whether the random number $R_B$ generated by the entity B in the first message is consistent with a random number $R_B$ comprised in the signature of the entity A, and if all are positive, then determining the entity A as being legal; otherwise, determining the entity A as being illegal.

2. The anonymous entity authentication method according to claim 1, wherein after the entity A receives the third message and before the entity A sends the fourth message to the entity B, the method further comprises:

the entity A determining whether a random number $R'_A$ generated by the entity A in the second message is consistent with a random number $R'_A$ comprised in the signature of the trusted third party TP; and the entity A sending the fourth message to the entity B comprises:

the entity A sending the fourth message to the entity B when the random number $R'_A$ generated by the entity A in the second message is determined as being consistent with the random number $R'_A$ comprised in the signature of the trusted third party TP.

3. The anonymous entity authentication method according to claim 1, wherein:

the first message comprises an identity $I_{GB}$ of a group GB where the entity B resides, and the second message further comprises $I_{GB}$, the trusted third party TP further verifies the group GB against $I_{GB}$ for legality, and the third message further comprises a verification result $Res_{GB}$ of the group GB; and after the entity B determines from the verification result the legality of the entity A, the method further includes: the entity B sending a fifth message to the entity A, wherein the fifth message comprises a third token comprising a signature of the entity B; and the entity A verifying the fifth message upon reception of the fifth message and determining from a verification result the legality of the entity B.

4. The anonymous entity authentication method according to claim 3, wherein the entity A verifying the fifth message and determining from the verification result the legality of the entity B comprises:

a) the entity A verifying whether the signature of the trusted third party TP is valid and determining whether a random number $R'_A$ generated by the entity A in the second message is consistent with a random number $R'_A$ comprised in the signature of the trusted third party TP; and if they are consistent, then performing the step b); otherwise, determining the entity B as being illegal and ending the flow;

b) if the entity A determines from $Res_{GB}$ the group GB as being legal and valid, then performing the step c; otherwise, determining the entity B as being illegal and ending the flow; and c) the entity A obtaining a public key of the group GB by $I_{GB}$, verifying against the public key whether the signature of the entity B is valid, determining whether a distinguishing identifier of the group GA is consistent with a group distinguishing identifier GA comprised in the signature of the entity B and determining whether a random number $R_A$ generated by the entity A in the fourth message is consistent with a random number $R_A$ comprised in the signature of the entity B, and if all are positive, then determining the entity B as being legal; otherwise, determining the entity B as being illegal.

5. The anonymous entity authentication method according to claim 3, wherein before the entity A sends the fourth message to the entity B, the method further comprises:

the entity A verifying whether the signature of the trusted third party TP is valid and determining whether a random number $R'_A$ generated by the entity A in the second message is consistent with a random number $R'_A$ comprised in the signature of the trusted third party TP; and the entity A sending the fourth message to the entity B comprises:

the entity A sending the fourth message to the entity B when the signature of the trusted third party TP is verified as being valid and the random number $R'_A$ generated by the entity A in the second message is determined as being consistent with the random number $R'_A$ comprised in the signature of the trusted third party TP.

6. The anonymous entity authentication method according to claim 5, wherein the entity A verifying the fifth message and determining from the verification result the legality of the entity B further comprises:

a) if the entity A determines from $Res_{GB}$ the group GB as being legal and valid, then the entity A performs the step b); otherwise, the entity A determines the entity B as being illegal, and the flow ends; and b) the entity A obtaining a public key of the group GB by $I_{GB}$, verifying against the public key whether the signature of the entity B is valid, determining whether a distinguishing identifier of the group GA is consistent with a group distinguishing identifier GA comprised in the signature of the entity B and determining whether a random number $R_A$ generated by the entity A in the fourth message is consistent with a random number $R_A$ comprised in the signature of the entity B, and if all are positive, then determining the entity B as being legal; otherwise, determining the entity B as being illegal.

7. The anonymous entity authentication method according to claim 3, wherein the trusted third party TP checking the group GB against $I_{GB}$ for legality further comprises:

if $I_{GB}$ in the second message is the distinguishing identifier GB of the group GB, then the trusted third party TP searching for a valid public key $PublicKey_{GB}$ of the group GA, and if it is found, then determining GB as being legal; otherwise, determining GB as being illegal; or if $I_{GA}$ in the second message is a certificate $Cert_{GA}$ of the group GB, then the trusted third party TP checking the certificate $Cert_{GB}$ for validity $Valid_{GB}$, and if $Cert_{GB}$ is valid, then determining GB as being legal; otherwise, determining GB as being illegal.

8. The anonymous entity authentication method according to claim 3, wherein the first token comprises a token TokenTA, or the first token comprises tokens TokenTA1 and TokenTA2, wherein:
TokenTA comprises a signature of the trusted third party TP on a message comprising $R'_A$, $R_B$, $Res_{GB}$ and ResGA, TokenTA1 comprises a signature of the trusted third party TP on a message comprising $R'_A$ and $Res_{GB}$, and TokenTA2 comprises a signature of the trusted third party TP on a message comprising $R_B$ and $Res_{GA}$; and
$R'_A$ is a random number generated by the entity A comprised in the second message; and $R_B$ is a random number generated by the entity B comprised in the first message, and the second message also carries $R_B$.

9. The anonymous entity authentication method according to claim 8, wherein the second token comprises a token TokenAB comprising $R_A$, $R'_A$, $Res_{GB}$, $Res_{GA}$, TokenTA and a signature of the entity A on a message comprising GA, $R_A$, GB, $R_B$, $Res_{GB}$, $Res_{GA}$ and TokenTA; or
the second token comprises $R_A$, $Res_{GA}$, TokenTA2 and a signature of the entity A on a message comprising GA, $R_A$, GB, $R_B$ and TokenTA2; and $R_A$ is a random number generated by the entity A comprised in the message 4.

10. The anonymous entity authentication method according to claim 3, wherein the third token comprises TokenBA comprising a signature of the entity B on a message comprising GB, $R_B$, GA and $R_A$; and
$R_A$ is a random number generated by the entity A comprised in the fourth message; and $R_B$ is a random number generated by the entity B comprised in the first message, and the second message also carries $R_B$.

11. The anonymous entity authentication method according to claim 1, wherein the trusted third party TP checking the group GA against $I_{GA}$ for legality further comprises:
if $I_{GA}$ in the second message is the distinguishing identifier GA of the group GA, then the trusted third party TP searching for a valid public key $PublicKey_{GA}$ of the group GA, and if it is found, then determining GA as being legal; otherwise, determining GA as being illegal; or
if $I_{GA}$ in the second message is a certificate $Cert_{GA}$ of the group GA, then the trusted third party TP checking the certificate $Cert_{GA}$ for validity $Valid_{GA}$, and if $Cert_{GA}$ is valid, then determining GA as being legal; otherwise, determining GA as being illegal.

12. An anonymous entity authentication apparatus, comprising:
a first message receiving unit configured to receive a first message sent by an entity B;
a first message sending unit configured to send a second message to a trusted third party TP, wherein the second message comprises an identity $I_{GA}$ of a group GA where the anonymous entity authentication apparatus resides, and an identity of the anonymous entity authentication apparatus is different from the identity $I_{GA}$ of the group GA where the anonymous entity authentication apparatus resides;
a second message receiving unit configured to receive a third message returned from the trusted third party TP, wherein the third message comprises a verification result $Res_{GA}$ of the group GA and a first token comprising a signature of the trusted third party TP; and
a second message sending unit configured to send a fourth message to the entity B upon reception of the third message, wherein the fourth message comprises $I_{GA}$ and a second token comprising $Res_{GA}$, the first token and a signature of the entity A;
wherein the anonymous entity authentication apparatus comprises a transmitter to transmit messages and a receiver to receive messages,
wherein the first message received by the first message receiving unit further comprises an identity $I_{GB}$ of a group GB where the entity B resides, and an identity of the entity B is different from the identity $I_{GB}$ of the group GB where the entity B resides; and the second message sent by the first message sending unit further comprises $I_{GB}$, and the third message received by the second message receiving unit further comprises a verification result $Res_{GB}$ of the group GB; and
the apparatus further comprises:
a third message receiving unit configured to receive a fifth message sent by the entity B after the fourth message is sent to the entity B, wherein the fifth message comprises a third token comprising a signature of the entity B; and
an entity authenticating unit configured to verify the fifth message upon reception of the fifth message and to determine from a verification result the legality of the entity B;
wherein the entity authenticating unit is configured:
a) to verify whether the signature of the trusted third party TP is valid and to determine whether a random number $R'_A$ generated by the anonymous entity authentication apparatus is the second message is consistent with a random number $R'_A$ comprised in the signature of the trusted third party TP; and if they are consistent, to perform the step b); otherwise, to determine the entity B as being illegal and end the flow;
b) if the group GB is determined from $Res_{GB}$ as being legal and valid, to perform the step c); otherwise, to determine the entity B as being illegal and end the flow; and
c) to obtain a public key of the group GB by $I_{GB}$, to verify against the public key whether the signature of the entity B is valid, to determine whether a distinguishing identifier of the group GA is consistent with a group distinguishing identifier GA comprised in the signature of the entity B and to determine whether a random number $R_A$ generated by the entity, A in the fourth message is consistent with a random number $R_A$ comprised in the signature of the entity B and, if all are positive, to determine the entity B as being legal; otherwise, to determine the entity B as being illegal.

13. The anonymous entity authentication apparatus according to claim 12, wherein the second message sending unit is configured:
to determine whether a random number $R'_A$ generated by the entity A in the second message is consistent with a random number $R'_A$ comprised in the signature of the trusted third party TP before sending the fourth message to the entity B; and when they are consistent, to send the fourth message to the entity B.

14. The anonymous entity authentication apparatus according to claim 12, wherein the second message sending unit is further configured:
to verify whether the signature of the trusted third party TP is valid and to determine whether a random number $R'_A$ generated by the entity A in the second message is consistent with a random number $R'_A$ comprised in the signature of the trusted third party TP before sending the fourth message to the entity B; and if both are positive, to send the message to the entity B; and the entity authenticating unit is configured:
a) if the group GB is determined from $Res_{GB}$ as being legal and valid, to perform the step b; otherwise, to determine the entity B as being illegal and end the flow; and
b) to obtain a public key of the group GB by $I_{GB}$, to verify against the public key whether the signature of the entity B is valid, to determine whether a distinguishing identifier of the group GA is consistent with a group distinguishing identifier GA comprised in the signature of the entity B and to determine whether a random number $R_A$ generated by the entity A in the fourth message is consistent with a random number $R_A$ comprised in the signature of the entity B, and if all are positive, to determine the entity B as being legal; otherwise, to determine the entity B as being illegal.

15. An anonymous entity authentication apparatus, wherein
a first message sending unit configured to send a first message to an entity A to initiate an authentication process;
a first message receiving unit configured to receive a fourth message sent by the entity A, wherein the fourth message comprises an identity $I_{GA}$, of a group GA and a second token comprising a verification result $Res_{GA}$ of a trusted third party TP on the group GA, a first token and a signature of the entity A, and the first token comprises a signature of the trusted third party TP, wherein an identity of the entity A is different from the identity $I_{GA}$ of the group GA where the entity A resides; and
an entity authenticating unit configured to verify the fourth message upon reception of the fourth message and to determine from a verification result the legality of the entity A;
wherein the anonymous entity authentication apparatus comprises a transmitter to transmit messages and a receiver to receive messages;
wherein the entity authenticating unit is configured:
a) to verify whether the signature of the trusted third party TP is valid and to determine whether a random number $R_B$ generated by the anonymous entity authentication apparatus in the first message is consistent with a random number $R_B$ comprised in the signature of the trusted third party TP; and if both are positive, to perform the step b); otherwise, to determine the entity A as being illegal;
b) if the group GA is determined from $Res_{GA}$ as being legal and valid, to perform the step c); otherwise, to determine the entity A as being illegal; and
c) to obtain a public key of the group GA by $I_{GA}$, to verify against the public key whether the signature of the entity A is valid, to determine whether a distinguishing identifier of the group GB is consistent with a group distinguishing identifier GB comprised in the signature of the entity A and to determine whether the random number $R_B$ generated by the entity B in the first message is consistent with a random number $R_B$ comprised in the signature of the entity A, and if all are positive, to determine the entity A as being legal; otherwise, to determine the entity A as being illegal.

16. The anonymous entity authentication apparatus according to claim 15, wherein the apparatus further comprises:
a second message sending unit configured to send a fifth message to the entity A after determining from the verification result the legality of the entity A, wherein the fifth message comprises a third token comprising a signature of the entity B.

* * * * *